Nov. 9, 1948.  W. J. RADY  2,453,341
SYSTEM OF GENERATOR REGULATION
Filed Sept. 26, 1944
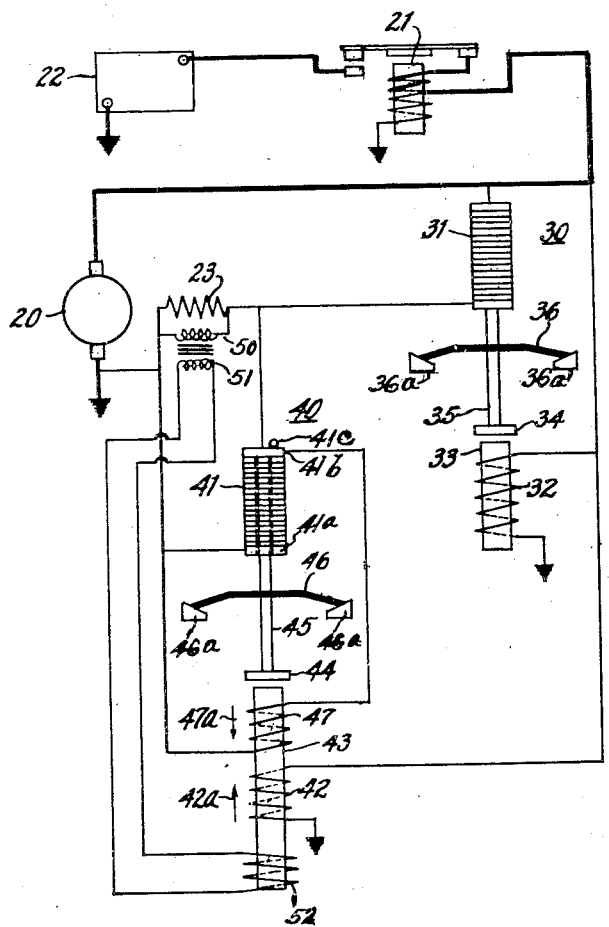
INVENTOR
William J. Rady
BY
Spencer Hardman & Fisher
his ATTORNEYs Patented Nov. 9, 1948

2,453,341

UNITED STATES PATENT OFFICE 2,453,341

SYSTEM OF GENERATOR REGULATION

William J. Rady, Anderson, Ind., assignor to General Motors Corporation, Detroit, Mich., a corporation of Delaware Application September 26, 1944, Serial No. 555,882

6 Claims. (Cl. 322—19)

This invention relates to carbon-pile voltage regulation for a variable speed generator. As the speed of the generator varies, there is considerable variation in the field current controlling resistance of the carbon-pile required to control high field current at low speed and low field current at high speed. Since there is a limit to which the carbon-pile resistance can be varied by an electromagnet responsive to generator voltage, the use of a carbon-pile regulator has been limited.

An object of the present invention is to make possible the use of a carbon-pile regulator to control the voltage of a generator whose speed varies between very wide limits. This object is accomplished by the provision of a variable resistance by-pass around generator field and means for controlling the by-pass in a manner such that, at low speed when the field current is high, the by-pass will have high resistance, and that, at high speed when the field current is low, the by-pass will have relatively low resistance. The result is that, throughout a wide range of generator speed, the variation in current flowing through the carbon-pile of the voltage regulator is much less than the variation in the current flowing through the generator field.

Further objects and advantages of the present invention will be apparent from the following description, reference being had to the accompanying drawing, wherein a preferred form of embodiment of the present invention is clearly shown.

The figure of the drawing is a wiring diagram showing an embodiment of the invention.

Referring to the drawing, a generator 20 is connected by a relay 21 with a storage battery 22. When the generator 20 obtains a voltage sufficient to charge the battery, relay 21 closes; and relay 21 opens when generator voltage falls a predetermined amount below battery voltage. The generator 20 has a shunt field winding 23 in series with the carbon-pile 31 of a regulator 30 which comprises a coil 32 responsive to generator voltage and surrounding a core 33 cooperating with an armature 34 attached to a rod 35 with which a laminated leaf spring 36 is connected. Spring 36 is normally biased upwardly so as to exert a predetermined pressure upon the discs of the carbon-pile 31. Spring 36 so cooperates with abutments 36a that the force of the spring 36 increases in proportion to the increase of magnetic pull as the air gap between the armature 34 and the core 33 decreases.

The instrument 40 includes a carbon-pile 41 shunting the field winding 23. As the pile 41 provides a by-pass around the field winding 23, the instrument 40 may be called a by-pass controller. The controller 40 has a coil 42 responsive to generator voltage surrounding a core 43 cooperating with an armature 44 attached to a rod 45 which extends from the armature 44 upwardly through the fixed terminal 41a of the pile and the washer-like discs of the pile 41 and which is attached to the movable terminal 41b. A spring 46 is attached to the rod 45 and bears against abutments 45a. The force of the spring 46 increases in proportion to the magnetic pull as the gap between the armature 44 and the core 43 decreases. Spring 46 normally locates the terminal 41b against a stop 41c. The pile 41 is normally practically open-circuited. Core 43 is surrounded by a magnet coil 47 responsive to voltage impressed upon field winding 23. The coils 42 and 47 are in bucking relation as indicated by arrows 42a and 47a.

At low speed when the relay 21 closes, the field current is relatively high. The magnetic effects of coils 42 and 47 are then substantially equal so that the spring 46 holds the upper terminal 41b against the stop 41c. The by-pass pile 41 is practically open circuited. A small change in resistance of pile 31 will control the voltage drop across the field winding 23 and the coil 47. This voltage drop is at the maximum controlled value at low speed. As the generator speed increases, this voltage drop should decrease because field strength should decrease in order to limit the generator voltage. This voltage drop is generator voltage less the voltage drop in the pile 31. If the current in pile 31 were no greater than the field current, it is apparent that pile 31 must have very high resistance at high speed.

The present system of regulation provides for so decreasing the resistance of by-pass 41 as speed increases that the current which passes through pile 31 decreases at a rate which is much less than the rate of decrease of field current. Therefore the resistance of pile 31 will be much less at maximum speed than would be the case if pile 31 carried only the field current.

The decrease of resistance of by-pass pile 41 with increasing speed is effected in the following manner. As regulator 30 operates to increase the resistance of pile 31 with speed increase, the voltage drop across coil 47 of controller 40 decreases, and coil 42 becomes increasingly effective to oppose spring 46 and to cause upper terminal 41b to be increasingly forced toward terminal 41a to increase the compression of pile 41. As its resistance decreases, the amount of current in pile 41 increases. With increasing speed, current in pile 41 increases although current in field winding 23 decreases. Consequently the total current in pile 31 decreases at a rate substantially less than the rate of decrease of field current. Therefore the regulator 30 is able to control the voltage drop across field winding 23 over a wide range of generator speeds because the amount of resistance in pile 31 required for regulation is much less than it would have been if pile 31 carried only the current in field winding 23.

In order that the controller 40 will not be affected by sudden changes in field current, the field 23 is connected with the primary 50 of a transformer whose secondary 51 is connected with a coil 52 surrounding the core 43. When there is a sudden reduction of field current resulting from a sudden reduction of voltage drop across field 23 and across coil 47, coil 52 aids coil 47. When there is a sudden increase of current in field winding 23 due to a sudden increase in voltage drop across field winding 23 and across coil 47, coil 52 opposes coil 47. In this way stability of the controller 40 is maintained.

While the embodiment of the present invention as herein disclosed, constitutes a preferred form, it is to be understood that other forms might be adopted, all coming within the scope of the claims which follow.

What is claimed is as follows:

1. A system of regulation for a variable speed generator having an armature and comprising a generator shunt field winding and a variable resistance unit connected in parallel, one end of the parallel circuit being connected with one terminal of the armature, a carbon pile connected with the other terminal of the armature and with the other end of the parallel circuit, a spring normally biasing the carbon pile into low resistance status, an electromagnet opposing said spring and having a magnet coil responsive to generator voltage and tending to increase the resistance of the carbon pile as generator voltage tends to increase whereby, as speed increases, the voltage drop across the carbon pile increases and the voltage drop across the ends of the parallel circuit tends to decrease, and means responsive to the decrease in voltage drop across the ends of the parallel circuit for causing decrease in the resistance of the variable resistance unit whereby, as speed increases, current in the variable resistance increases and current in the shunt field winding decreases.

2. A system of regulation for a variable speed generator having a shunt field winding comprising a carbon-pile regulator having a carbon-pile for controlling the voltage impressed upon the generator field winding and means responsive to generator voltage for varying the resistance of the carbon-pile, a variable resistance by-passing the generator field winding, and means responsive to decrease of voltage impressed on the generator field winding for decreasing the by-pass resistance, said means including an electromagnet having bucking coils, one of which is responsive to generator voltage and the other to voltage impressed on the generator field winding.

3. A system of regulation for a variable speed generator having a shunt field winding comprising a carbon pile regulator having a carbon-pile for controlling the voltage impressed upon the generator field winding and means responsive to generator voltage for varying the resistance of the carbon-pile, a second carbon-pile by-passing the generator field winding, a spring tending to increase the resistance of the second carbon-pile, and an electromagnet opposing the spring for decreasing the resistance of the second carbon-pile and having bucking coils, one of which is responsive to generator voltage and the other to voltage impressed on the generator field winding.

4. A system of regulation for a variable speed generator having an armature and comprising a generator shunt field winding and a variable resistance unit connected in parallel, one end of the parallel circuit being connected with one terminal of the armature, a carbon pile connected with the other terminal of the armature and with the other end of the parallel circuit, a spring normally biasing the carbon pile into low resistance status, an electromagnet opposing said spring and having a magnet coil responsive to generator voltage and tending to increase the resistance of the carbon pile as generator voltage tends to increase whereby, as speed increases, the voltage drop across the carbon pile increases and the voltage drop across the ends of the parallel circuit tends to decrease, means responsive to the decrease in voltage drop across the ends of the parallel circuit for causing decrease in the resistance of the variable resistance unit whereby, as speed increases, current in the variable resistance increases and current in the shunt field winding decreases and provisions for nullifying the effect on said means due to voltage induced in the generator field winding by virtue of sudden change in current therein.

5. A system of regulation for a variable speed generator having a shunt field winding comprising a carbon-pile regulator having a carbon-pile for controlling the voltage impressed upon the generator field winding and means responsive to generator voltage for varying the resistance of the carbon-pile, a variable resistance by-passing the generator field winding, and means responsive to decrease of voltage impressed on the generator field winding for decreasing the by-pass resistance, said means including an electromagnet having bucking coils, one of which is responsive to generator voltage and the other to voltage impressed on the generator field winding and having another magnet coil which is inductively related to the generator field and which is so wound that it aids the coil responsive to voltage impressed on the generator when there is a sudden decrease of field current, and bucks it when there is a sudden increase of field current.

6. A system of regulation for a variable speed generator having a shunt field winding comprising a carbon-pile regulator having a carbon-pile for controlling the voltage impressed upon the generator field winding and means responsive to generator voltage for varying the resistance of the carbon-pile, a second carbon-pile by-passing the generator field winding, a leaf spring tending to increase the resistance of the second carbon-pile, and an electromagnet opposing the spring for decreasing the resistance of the second carbon-pile and including an armature, core and windings, an abutment member engaged by the end of the spring and so related thereto that increase in spring force is substantially proportionate to increase in magnetic force opposing the spring as the gap between the armature and core decreases, said windings being three in number: (1) a winding responsive to generator voltage (2) a winding responsive to voltage impressed on the generator field winding (3) a winding inductively related to the generator field winding and so wound that it aids the second winding when there is a sudden decrease of field current and that it bucks the second winding when there is a sudden increase of field current.

WILLIAM J. RADY.

REFERENCES CITED

The following references are of record in the file of this patent:

UNITED STATES PATENTS

| Number | Name | Date |
| --- | --- | --- |
| 1,252,511 | Turbayne | Jan. 8, 1918 |
| 1,783,142 | Sayres et al. | Nov. 25, 1930 |
| 1,933,858 | Keller | Nov. 7, 1933 |